United States Patent
Weedon (10) Patent No.: US 6,526,865 B2
(45) Date of Patent: Mar. 4, 2003

(54) WELD CYLINDER

(75) Inventor: Bradley Allen Weedon, Indianapolis, IN (US)

(73) Assignee: SMC Corporation of America, Indianapolis, IN (US)

( * ) Notice: Subject to any disclaimer, the term of this patent is extended or adjusted under 35 U.S.C. 154(b) by 0 days.

(21) Appl. No.: 09/842,385

(22) Filed: Apr. 25, 2001

(65) Prior Publication Data

US 2002/0157532 A1 Oct. 31, 2002

(51) Int. Cl.$^7$ ................................................ F01B 7/20
(52) U.S. Cl. ........................ 92/87; 92/110; 92/165 PR
(58) Field of Search ............................. 92/51, 52, 87, 92/109, 110, 111, 161, 165 R, 165 PR (56) References Cited

U.S. PATENT DOCUMENTS

| | | | | |
|---|---|---|---|---|
| 2,081,922 A | * | 6/1937 | Gartin | 92/111 X |
| 2,193,736 A | * | 3/1940 | Onions | 92/111 X |
| 2,891,513 A | * | 6/1959 | Fagge | 92/161 X |
| 2,982,257 A | * | 5/1961 | Fagge | 92/111 X |
| 3,253,519 A | | 5/1966 | De Roo | 92/110 |
| 3,335,642 A | * | 8/1967 | Rosaen | 92/110 X |
| 3,678,805 A | | 7/1972 | Weyman | |
| 4,111,100 A | * | 9/1978 | Boyer | 92/165 PR |
| 4,609,146 A | * | 9/1986 | Walto | 92/87 X |
| 4,798,115 A | | 1/1989 | Schmeck | |
| 4,907,495 A | | 3/1990 | Sugahara | |
| 5,623,861 A | | 4/1997 | Ward et al. | |
| 5,974,948 A | * | 11/1999 | Thompson et al. | 92/165 PR |

FOREIGN PATENT DOCUMENTS

| | | | | |
|---|---|---|---|---|
| DE | 4116399 A | * | 11/1992 | 92/51 |
| GB | 2274323 A | * | 7/1994 | 92/165 PR |
| SU | 748044 | * | 7/1980 | 92/52 |
| SU | 769127 | * | 10/1980 | 92/52 |
| SU | 987218 A | * | 1/1983 | 92/52 |

OTHER PUBLICATIONS

Catalog, SMC Corporation, "Non–rotating Double Power Cylinder; Series MGZ,", Jun., 1999.
Catalog, Grossel Tool Company, "Air & Hydraulic Cylinders for Resistance Welding Clamping & Piercing," date unknown.
Catalog, SMC Corporation, Clamp Cylinder Series CK1/Standard Type, Jul. 1995.
Four color photographs of a weld cylinder, date unknown.
"Resistance Welders Arc Welders," Savage Sales, date unknown.

* cited by examiner

Primary Examiner—Edward K. Look
Assistant Examiner—Thomas E. Lazo
(74) Attorney, Agent, or Firm—Bose McKinney & Evans LLP (57) ABSTRACT

According to the present disclosure, a fluid cylinder is provided that is configured to move an object between first and second positions. The fluid cylinder includes a cylinder housing and a shaft configured to move between extended and retracted positions relative to the cylinder housing. Preferably, the fluid cylinder includes a scraper positioned to contact an outer surface of the shaft to remove contaminants therefrom during movement of the shaft. Furthermore, the preferred fluid cylinder includes an anti-rotation mechanism positioned to prevent rotation of the shaft.

67 Claims, 6 Drawing Sheets

FIG. 8

WELD CYLINDER

BACKGROUND AND SUMMARY OF THE INVENTION

The present invention relates to pneumatic cylinders. More particularly, the present invention relates to pneumatic cylinders used on welding systems.

In manufacturing, it is often convenient and efficient to provide devices to perform repetitive functions. To facilitate a repetitive welding operation, weld systems are provided to perform a repeated weld operation on a stream of identical parts. Some weld systems have weld cylinders that move weld tips adjacent to the part being welded. After the weld operation is completed, the weld cylinder backs the weld tip away from the part to provide clearance for removing the welded part and positioning the next part to be welded.

According to the present invention, a fluid cylinder is provided that is configured to move an object between first and second positions. The fluid cylinder includes a cylinder housing, a shaft, and a piston. The shaft is configured to move between extended and retracted positions relative to the cylinder housing and includes a central axis and an outer surface. The piston is configured to move the shaft between the extended and retracted positions. The fluid cylinder further includes a scraper positioned to contact the outer surface of the shaft to remove contaminants therefrom during movement of the shaft and an anti-rotation mechanism positioned to prevent rotation of the shaft about the central axis.

According to another embodiment of the present invention, a fluid cylinder is provided that is configured to move an object between first and second positions. The fluid cylinder includes a cylinder housing, a shaft, and an actuation piston. The shaft is configured to move between extended and retracted positions relative to the cylinder housing and includes a central axis and an outer surface. The actuation piston is configured to move the shaft between the extended and retracted positions. The piston includes at least two actuation piston heads and a rod positioned to couple the actuation piston heads together. The fluid cylinder further includes a scraper positioned to contact the outer surface of the shaft to remove contaminants therefrom during movement of the shaft.

According to another embodiment of the present invention, a fluid cylinder is provided that is configured to move an object between first and second positions. The fluid cylinder includes a cylinder housing, a shaft having a central axis, and a piston. The cylinder housing includes a cylinder body having a first end and a second end spaced apart from the first end and a closure coupled to the first end of the cylinder body. The shaft is positioned to extend through the closure of the cylinder housing and move between extended and retracted positions relative to the cylinder housing. The piston is configured to move the shaft between the extended and retracted positions. The fluid cylinder further includes an anti-rotation mechanism configured to prevent rotation of the shaft about the central axis. The anti-rotation mechanism is spaced apart from the closure and coaxial with the central axis of the shaft.

According to another embodiment of the present invention, a fluid cylinder is provided that is configured to move an object between first and second positions. The fluid cylinder includes a cylinder housing, a shaft, and an actuation piston. The shaft is positioned to move between extended and retracted positions relative to the cylinder housing. The actuation piston is positioned in the housing and configured to move the shaft between the extended and retracted positions. The actuation piston includes a hollow rod and an actuation piston head coupled to the hollow rod. The fluid cylinder further includes a stationary piston coupled to the housing. The stationary piston includes a stationary piston head positioned in the hollow rod. The actuation piston head and stationary piston head cooperate to define a space therebetween. The hollow rod includes an aperture permitting communication of fluid through the hollow rod with the space defined between the actuation and stationary piston heads.

According to another embodiment of the present invention, a fluid cylinder is provided that is configured to move an object between first and second positions. The fluid cylinder includes, a cylinder housing, a shaft, and an actuation piston. The shaft is positioned to move between extended and retracted positions relative to the cylinder housing. The actuation piston is positioned in the housing and configured to move the shaft between the extended and retracted positions. The actuation piston includes a hollow rod, a first actuation piston head coupled to the hollow rod, and a second actuation piston head coupled to the hollow rod. The first actuation piston head is spaced apart from the second actuation piston head. The fluid cylinder further includes a stationary piston coupled to the housing. The stationary cylinder includes a first stationary piston head positioned in the hollow rod between the first and second actuation piston heads and a second stationary piston head positioned in the hollow rod and spaced apart from the first stationary piston head.

According to another embodiment of the present invention, a fluid cylinder is provided that is configured to move an object between first and second positions. The fluid cylinder includes a cylinder housing, a shaft, and an actuation piston. The cylinder housing includes a first end and a second end spaced apart from the first end. The shaft is positioned to move between extended and retracted positions relative to the cylinder housing. The actuation piston is positioned in the housing and configured to move the shaft between the extended and retracted positions. The actuation piston includes a hollow rod and an actuation piston head coupled to the hollow rod. The hollow rod has first and second ends positioned between the first and second ends of the cylinder housing when the shaft is in the extended position. The fluid cylinder further includes a stationary piston coupled to the housing. The stationary piston includes a stationary piston head positioned in the hollow rod.

According to another preferred embodiment of the present invention, a fluid cylinder is provided that is configured to move an object between first and second positions. The fluid cylinder includes a cylinder housing, a shaft, and an actuation piston. The shaft is positioned to move between extended and retracted positions relative to the cylinder housing. The actuation piston is positioned in the housing and configured to move the shaft between the extended and retracted positions. The actuation piston includes a hollow rod and an actuation piston head coupled to the hollow rod. The fluid cylinder further includes a stationary piston coupled to the housing. The stationary piston includes a stationary piston head positioned in the hollow rod. The fluid cylinder further includes an anti-rotation mechanism positioned in the hollow rod.

According to another embodiment of the present disclosure, a fluid cylinder for use with a fixture is provided. The fluid cylinder includes a cylinder housing, a shaft, and a piston. The cylinder housing includes a cylinder body and a cylinder body mount having a closure portion configured to close an end of the cylinder body and a mount portion configured to mount to the fixture. The closure portion is coupled to the mount portion. The cylinder housing further including means for coupling the cylinder body mount to the cylinder body without heating the cylinder body. The shaft is positioned to move between extended and retracted positions relative to the cylinder housing. The piston is configured to move the shaft between the extended and retracted positions.

Additional features of the disclosure will become apparent to those skilled in the art upon consideration of the following detailed description when taken in conjunction with the accompanying drawings.

BRIEF DESCRIPTION OF THE DRAWINGS

The detailed description particularly refers to the accompanying figures in which.

DETAILED DESCRIPTION OF THE DRAWINGS

Figure 1:
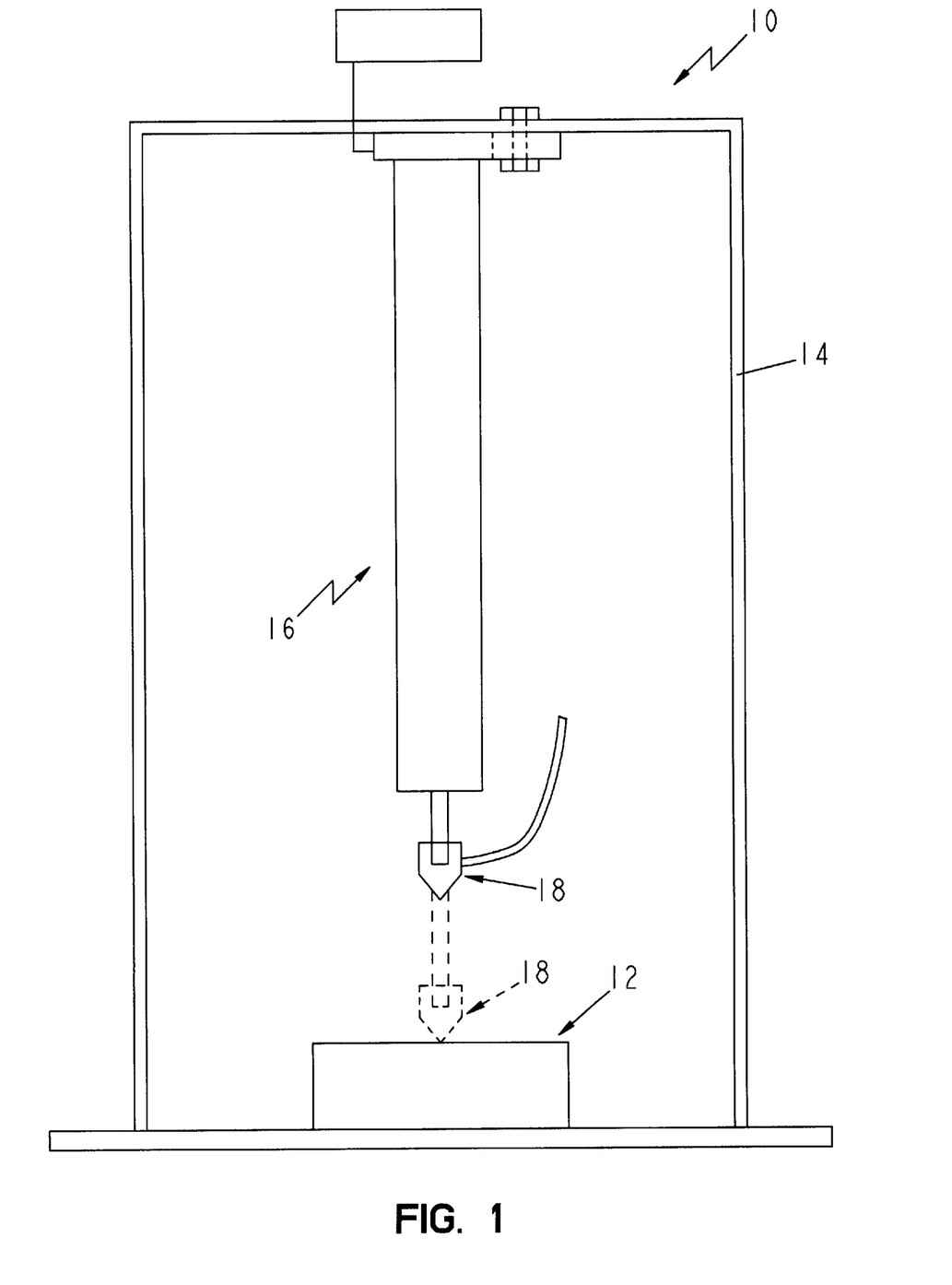
FIG. 1 is a diagrammatic view of a welder showing the welder including a frame and a weld cylinder having a weld tip coupled thereto, the weld cylinder moves the weld tip from a position (shown in phantom) adjacent to a component being welded and to a position (shown in solid) away from the component after a weld operation has been completed.

In manufacturing, it is often convenient and efficient to provide devices to perform repetitive functions. As shown in FIG. 1, a welder 10 is provided to perform a repetitive welding operation on one of many identical components 12. Welder 10 includes a frame 14, a weld cylinder 16 coupled to frame 14, and an electric weld tip 18 coupled to weld cylinder 16. During a welding operation, weld cylinder 16 raises and lowers weld tip 18 relative to component 12 to facilitate placement and removal of components 12 from welder 10. After a component 12 is placed below weld tip 18, weld cylinder 16 moves weld tip 18 adjacent to component 12 (as shown in phantom) so that component 12 can be welded. After the welding operation is performed, weld cylinder 16 raises weld tip 18 to provide clearance for removing component 12 from welder 10 so that the next component 12 can be positioned under weld tip 18 for welding. When weld tip 18 is raised, more clearance is provided so that component 12 can be removed from welder 10 with less likelihood of damaging weld tip 18.

Figure 2:
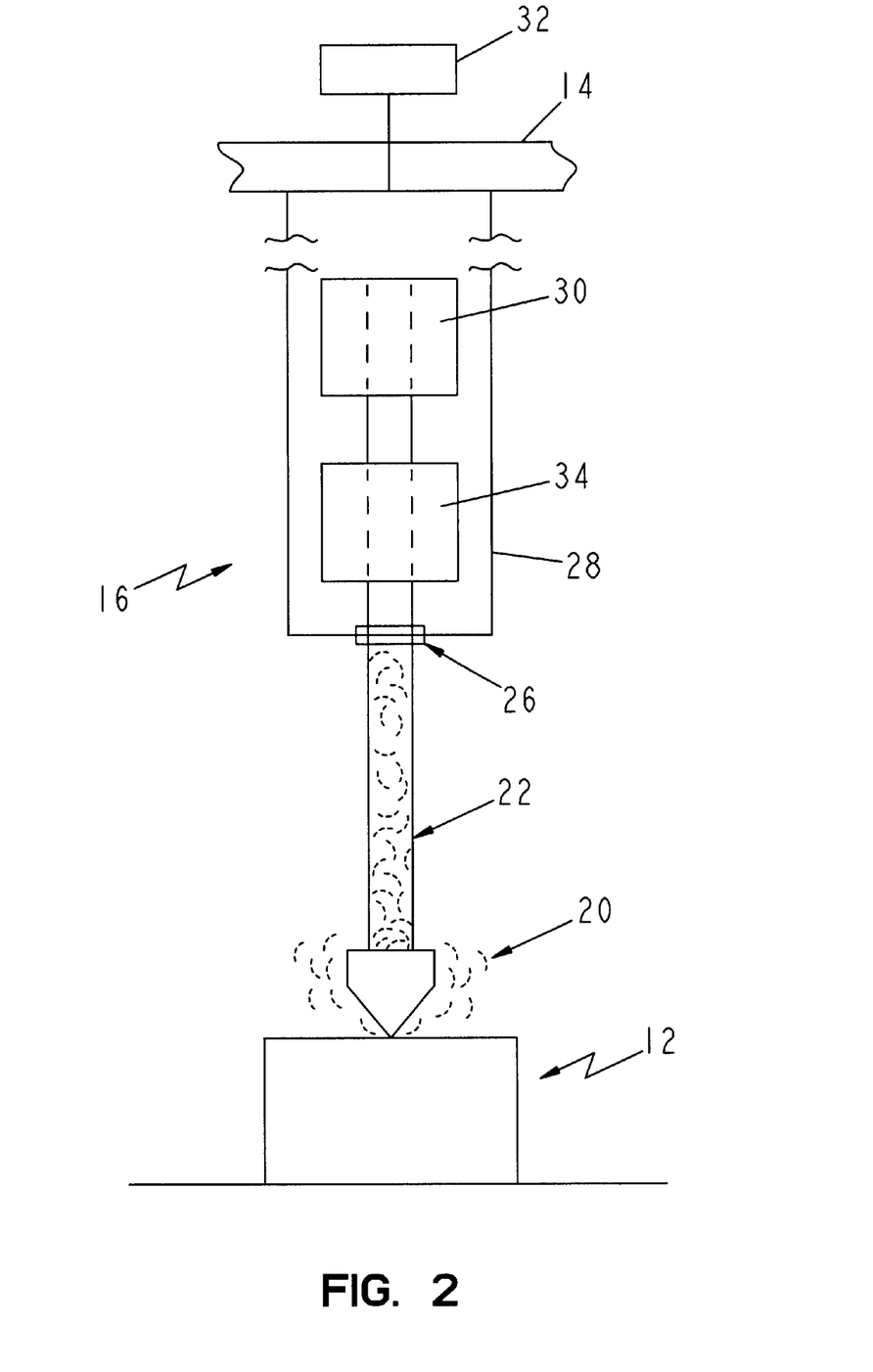
FIG. 2 is another diagrammatic view of the welder of FIG. 1 showing the weld cylinder including a housing (shown fragmented) coupled to the frame (shown fragmented) and a shaft extending from the housing and carrying the weld tip, the weld tip creating spatter during welding of the component, the spatter collecting on the shaft, and the weld cylinder further including a scraper that removes the spatter from the shaft so that the spatter is not drawn into the housing when the shaft is retracted.

As shown in FIG. 2, weld cylinder 16 includes a cylinder housing 28, a shaft 22 that extends from cylinder housing 28 and carries weld tip 18, and a piston 30 coupled to shaft 22 that raises and lowers shaft 22 relative to cylinder housing 28. A pneumatic or other fluid-driven system 32 is provided to power and control the moving of piston 30.

The intense heat of welding generates spatter 20 that can collect on shaft 22 as shown in FIG. 2. To prevent spatter 20 from contaminating the interior of weld cylinder 16, a scraper 26 is provided to remove spatter 20 and other contaminants from shaft 22 as it is raised and drawn further into cylinder housing 28. Weld cylinder 16 may also be used in other unclean environments such as machining areas, dusty areas, etc. According to alternative embodiments of the present disclosure, a scraper is not provided.

Weld cylinder 16 is provided with an anti-rotation mechanism 34 to block rotation of shaft 22 as it is raised and lowered by piston 30 so that weld tip 18 and the electrical connection thereto remain at a constant angular position relative to cylinder housing 28 for each component welded. Thus, according to the present disclosure, weld cylinder 16 is provided with scraper 26 to remove spatter and other contaminants from shaft 22 and anti-rotation mechanism 34 to block rotation of shaft 22 during raising and lowering of weld tip 18. According to alternative embodiments of the present disclosure, an anti-rotation mechanism is not provided.

According to the present disclosure, various configurations of scrapers, pistons, and anti-rotation mechanisms are provided. For example, according to alternative embodiments of the present disclosure, pistons having single or multiple actuation and stationary piston heads are provided. Stationary pistons having stationary piston heads (if necessary) and rods (if necessary) positioned either internally or externally of the actuation piston rods are provided. A description of one such configuration is provided in reference to the preferred embodiment of the present disclosure.

Figure 3:
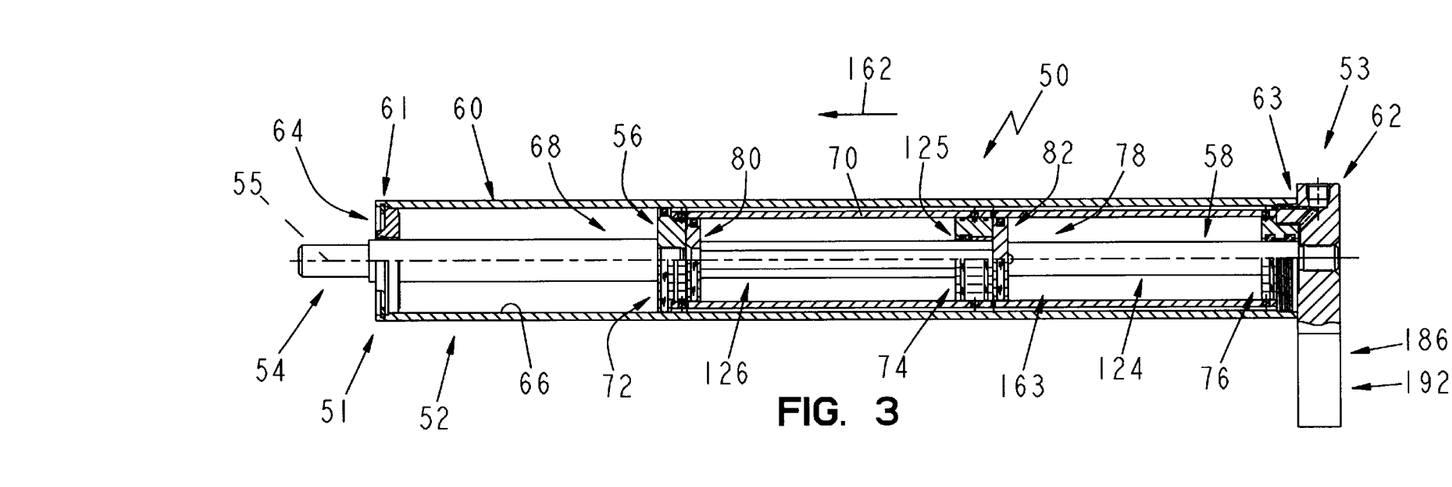
FIG. 3 is a sectional view of a preferred embodiment weld cylinder showing the weld cylinder including a cylinder housing and a shaft in a retracted position.
Figure 4:
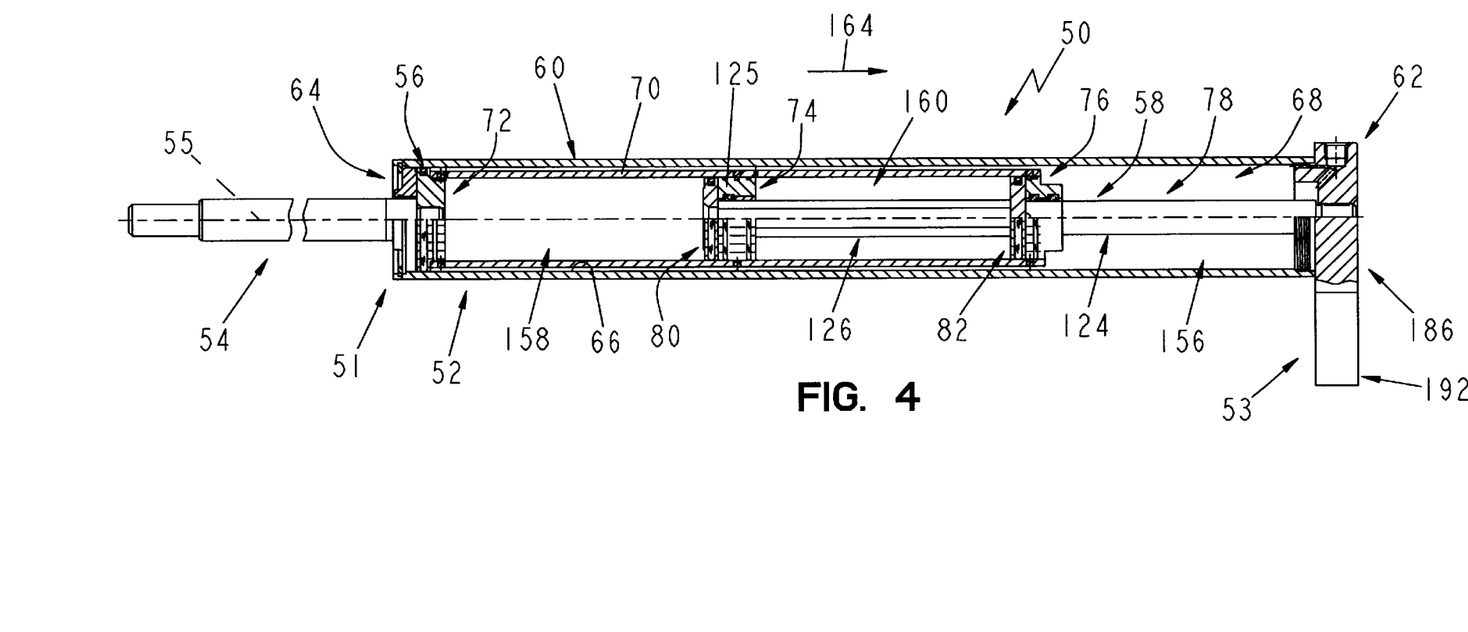
FIG. 4 is a view similar to FIG. 3 showing the shaft in an extended position.

As shown in FIG. 3, a preferred embodiment weld cylinder 50 is provided that includes a cylinder housing 52 having first and second ends 51, 53 and a shaft 54 configured to move between a retracted position, as shown in FIG. 3, and an extended position, as shown in FIG. 4. Weld cylinder 50 further includes an actuation piston 56 coupled to shaft 54 that is configured to move shaft 54 between the retracted and extended positions, and a stationary piston 58 coupled to cylinder housing 52. According to the preferred embodiment of the present disclosure, shaft 54 has a central axis 55 and is made of chrome plated carbon steel. According to alternative embodiments of the present disclosure, the shaft is made of other types of steel, metal, or materials known to those of ordinary skill in the art; plated with other materials; or unplated.

Shaft 54 is configured to carry an electric weld tip (not shown). According to alternative embodiments of the present disclosure, the shaft is configured to carry or move other objects between two positions. For example, according to alternative embodiments of the present disclosure, the shaft is configured to couple to or contact press dies, chucks, robot components, lifters, shoot components, assembly line components, or any other object that requires movement from one position to another.

Cylinder housing 52 includes a tube-shaped, elongated cylinder body 60, a cylinder body mount 62, and a diskshaped closure 64 sized to receive shaft 54. Cylinder body 60 includes a first end 61, a second end 63, and an inner surface 66 defining an interior region 68 sized to receive actuation and stationary pistons 56, 58. Preferably, cylinder body 60, cylinder body mount 62, and closure 64 are made of aluminum. According to alternative embodiments, the cylinder housing is made of other metals or materials known to those of ordinary skill in the art.

During operation, actuation piston 56 slides on inner surface 66 within interior region 68 to move shaft 54 between the retracted and extended positions. As shown in FIG. 3, actuation piston 56 includes a hollow rod 70 having first and second ends 71, 73 and first, second, and third actuation piston heads 72, 74, 76. Stationary piston 58 includes a stationary rod 78 and first and second stationary piston heads 80, 82 coupled to stationary rod 78 and positioned in hollow rod 70.

Figure 5:
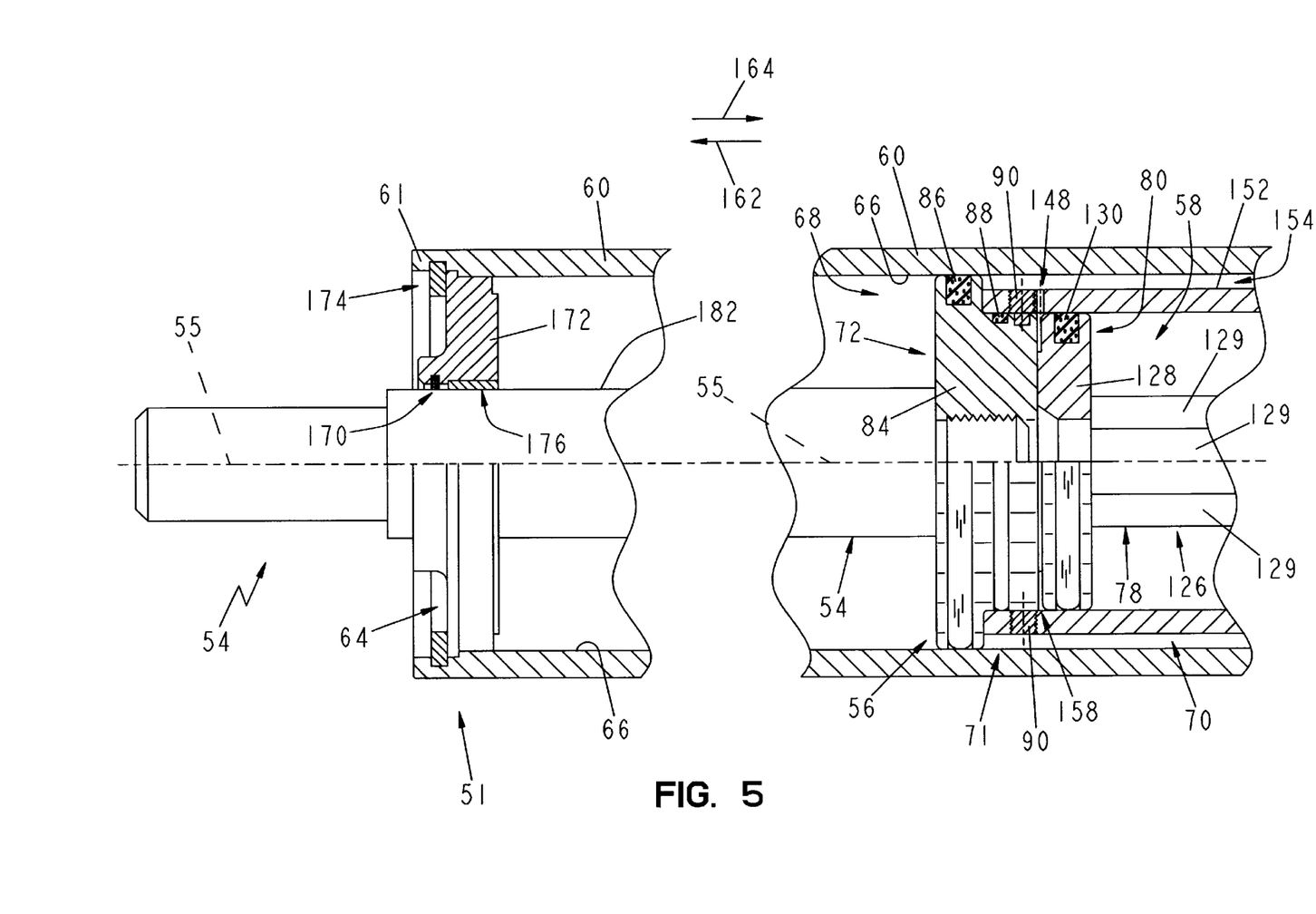
FIG. 5 is an enlarged view of a shaft end of the weld cylinder of FIG. 3 with portion fragmented away.

As shown in FIG. 5, first actuation piston head 72 includes a piston head body 84, an annular seal 86 that slides on inner surface 66, and an annular 88 positioned between hollow rod 70 and piston head body 84. Piston head body 84 is coupled to hollow rod 70 by a pair of set screws 90 as shown in FIG. 5. Shaft 54 is threaded or otherwise coupled to piston head body 84. According to the presently preferred embodiment of the disclosure, the seals are U-cup seals made of NBR (nitrile rubber). According to alternative embodiments, other types of seals and other types of rubber or materials known to those of ordinary skill in the art are used.

Figure 6:
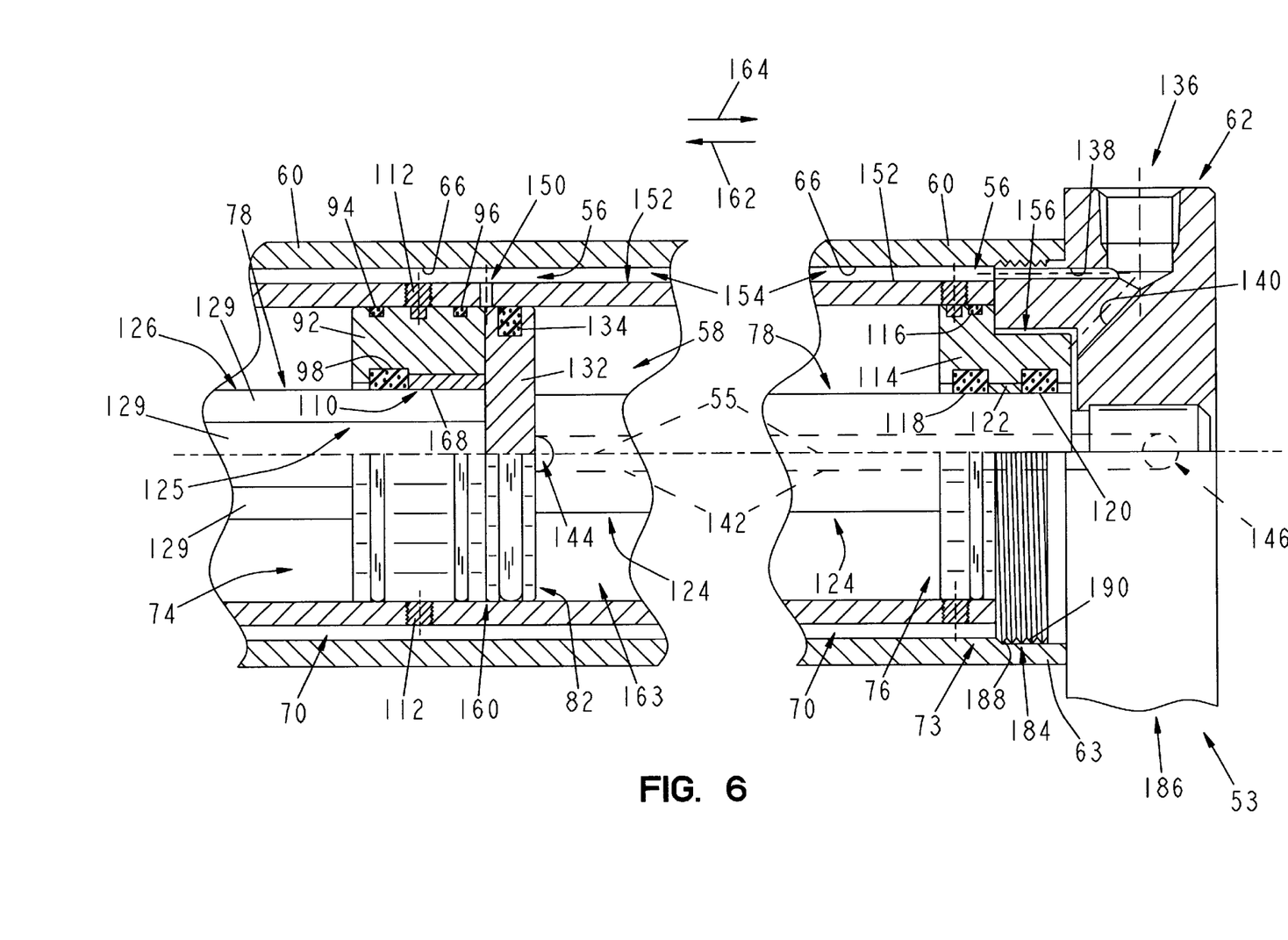
FIG. 6 is a view similar to FIG. 5 of a mount end of the weld cylinder of FIG. 3.

As shown in FIG. 6, second actuation piston head 74 includes a piston head body 92, first and second annular seals 94, 96 positioned between hollow rod 70 and piston head body 92, a hexagonal rod seal 98 positioned between stationary rod 78 and piston head body 92, and a hexagonal bearing 110 that has an annular outer surface a hexagonal inner surface 127 also positioned between piston head body 92 and stationary rod 78. A pair of set screws 112 couple piston head body 92 to hollow rod 70. Third actuation piston head 76 includes a piston head body 114, an annular 116 positioned between hollow rod 70 and piston head body 114, first and second annular rod seals 118, 120 positioned between piston head body 114 and stationary rod 78, and a circular bearing 122 that has annular inner and outer surfaces also positioned between piston head body 114 and stationary rod 78. According to the presently preferred embodiment of the disclosure, the bearings are made of bronze. According to alternative embodiments of the present disclosure, other materials known to those of ordinary skill in the art such as plastic composites are used for the bearings.

Stationary rod 78 includes a round rod 124 coupled to cylinder body mount 62 of cylinder housing 52 and a hexagonal rod 126 coupled to round rod 124. Hexagonal rod 126 also includes male threads that mate with female threads formed in round rod 124 to provide a coupling therebetween. Round rod 124 includes male threads configured to couple with female threads formed in cylinder body mount 62 to provide a coupling therebetween. According to an alternative embodiment of the present disclosure, the entire length of the stationary rod is hexagonal or non-circular. According to another embodiment of the present disclosure, the hexagonal rod is coupled to the cylinder housing and the round rod is coupled to the hexagonal rod.

As shown in FIG. 5, first stationary piston head 80 includes a piston head body 128 coupled to hexagonal rod 126 and an annular seal 130 positioned between piston head body 128 and hollow rod 70. Similarly, second stationary piston head 82 includes a piston head body 132 and an annular seal 134 positioned between hollow rod 70 and piston head body 132, as shown in FIG. 6. Piston head body 128 is coupled to hexagonal rod 126 by crimping.

According to the preferred embodiment of the present disclosure, the piston head bodies are made of aluminum and the rods are made of chrome-plated carbon steel. According to alternative embodiments of the present disclosure, the piston heads and rods are made of other metal and materials known to those of ordinary skill in the art.

As shown in FIG. 6, cylinder body mount 62 is formed to include a first port 136 and first and second passages 138, 140. First port 136 is coupled to a fluid system such as fluid system 32. Round rod 124 is formed to include a passage 142 and an outlet aperture 144, and cylinder body mount 62 is formed to include a second port 146 in fluid communication with the fluid system. As shown in FIGS. 5 and 6, hollow rod 70 is formed to include a pair of axially spaced-apart apertures 148, 150. Inner surface 66 of hollow rod 70 cooperates with an outer surface 152 of hollow rod 70 to define a passage 154 therebetween that communicates fluid from first passage 138 to apertures 148, 150.

To extend shaft 54, pressurized fluid is introduced into first port 136 by the fluid system. This pressurized fluid flows through first passage 138 and passage 154 to apertures 148, 150 and through second passage 140 to a space 156 defined between third actuation piston head 76 and cylinder body mount 62. Pressurized fluid flows through apertures 148, 150 into spaces 158, 160 defined between first actuation piston head 72 and first stationary piston head 80, and second actuation piston head 74 and second stationary piston head 82. The pressurized fluid creates force on first, second, and third actuation piston heads 72, 74, 76 in direction 162 to move actuation piston 56 and shaft 54 in direction 162 so that shaft 54 moves to the extended position.

To retract shaft 54, pressurized fluid is provided to second port 146 by the fluid system. This pressurized fluid flows through second port 146, passage 142, and out of outlet aperture 144, into a space 163 defined between second stationary piston head 82 and third actuation piston head 76. This pressurized fluid creates a force on third actuation piston head 76 in direction 164 causing actuation piston 56 to move in direction 164 and retract shaft 54.

During extension and retraction, hollow rod 70 remains positioned in cylinder body 60 so that first and second ends 71, 73 of hollow rod 70 are positioned between first and second ends 51, 53 of cylinder housing 52 when shaft 54 is in the extended and retracted positions. According to alternative embodiments of the present disclosure, the hollow rod extends beyond the cylinder housing when in the extended or retracted positions.

Hexagonal rod 126 and bearing 122 provide an anti-rotation mechanism 125 configured to prevent rotation of actuation piston 56 and shaft 54 during retraction and extension of shaft 54. Hexagonal rod 126 includes six longitudinally extending flats 129 that extend parallel to central axis 55. Inner surface 127 of bearing 122 defines a hexagonal opening 168 sized to receive hexagonal rod 126. Because hexagonal rod 126 is non-circular and hexagonal opening 168 is sized to receive hexagonal rod 126, actuation piston 56 is prevented from rotating during extension and retraction of shaft 54. Hexagonal rod 126 and bearing 122 are co-axial with central axis 55 of shaft 54 so that anti-rotation mechanism 125 is also co-axial with central axis 55.

According to alternative embodiments, other configurations of anti-rotation mechanisms are provided. For example, according to one alternative embodiment, the inner surface of the cylinder body is formed to include a longitudinally extending slot. A key is provided that is coupled to the hollow rod and positioned in the longitudinally extending slot. During retraction and extension of the shaft, the key rides in the longitudinally extending slot, but prevents rotation of the hollow rod.

Figure 7:
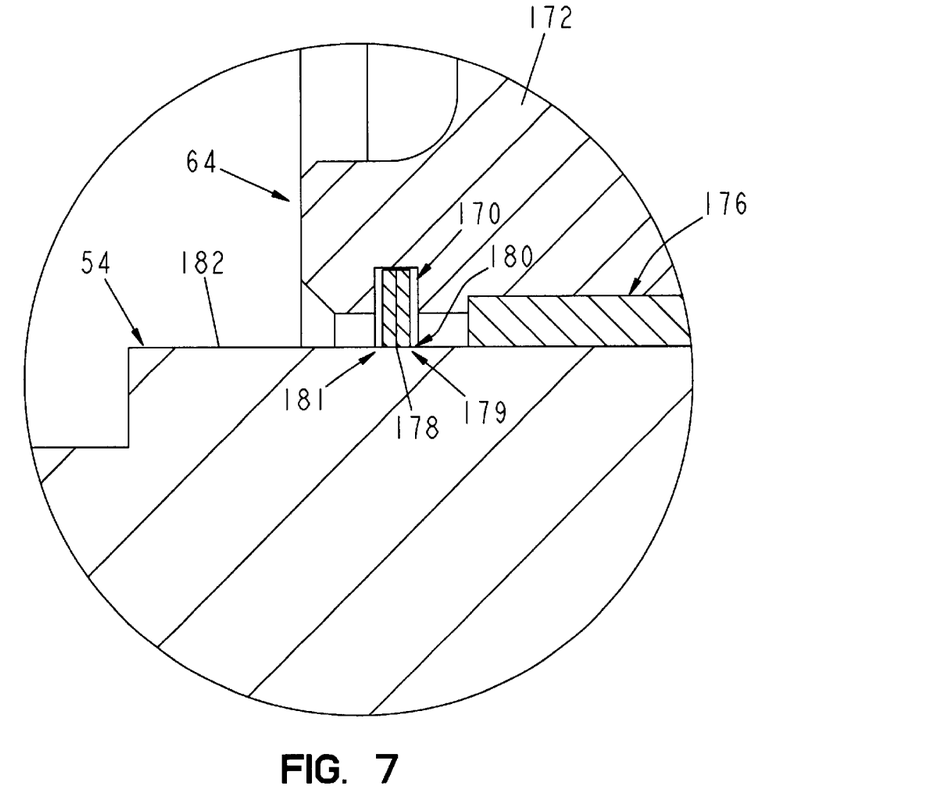
FIG. 7 is an enlarged view of a portion of the shaft end of the weld cylinder of FIG. 3.

As shown in FIGS. 5 and 7, fluid cylinder 50 further includes a scraper 170 coupled to closure 64. Closure 64 includes a closure body 172 retained within cylinder body 60 by a snap ring 174 and an annular bearing 176 positioned between closure body 172 and shaft 54. Scraper 170 is coupled to closure body 172 as shown in FIG. 5. Scraper 170 is shaped as a coiled annular ring that has slightly less than two turns. Scraper 170 includes an inner edge 178 defining a circular opening 180 sized to receive shaft 54. Inner edge 178 has sharp inner and outer corners 179, 181 as shown in FIG. 7.

Scraper 170 has an unrestrained inner diameter that is less than the outer diameter of shaft 54. When scraper 170 is positioned over shaft 54, it is expanded from its unrestrained position to fit over shaft 54. This expansion causes scraper 170 to have an inward bias so that inner edge 178 is urged toward an outer surface 182 of shaft 54. This maintains outer corner 181 in contact outer surface 182 of shaft 54 to scrape away or remove spatter or other contaminants from shaft 54 so that little or no contaminants enter interior region 68 of cylinder body 60 so that the integrity of the bearings and seals is maintained to promote long life of weld cylinder 50. Thus, according to the present disclosure, a fluid cylinder having a scraper and an anti-rotation mechanism is provided. According to the preferred embodiment of the present disclosure, scraper 170 is made of beryllium cooper. According to alternative embodiments of the present disclosure, other materials such as NBR or other materials known to those of ordinary skill in the art are used for the scraper.

As shown in FIG. 6, cylinder body mount 62 includes a closure portion 184 and a mount portion 186 integrally coupled to closure portion 184. Closure portion 184 includes male threads 188 that are received by female threads 190 formed in cylinder body 60. Preferably, LOCTITE®-brand adhesive is provided between threads 188, 190 to provide an airtight bond therebetween. Welding or other extreme heating is not required to couple cylinder body mount 62 to cylinder body 60 that may otherwise distort the cylinder housing and require additional machining. According to alternative embodiments of the present disclosure, other techniques for coupling the cylinder body mount to the cylinder body are provided without welding. For example, according to alternative embodiments, snap rings, bolts, screws, keys, adhesives, or other techniques known to those of ordinary skill in the art are used to couple the cylinder body mount to the cylinder body are used. According to another alternative embodiment of the present disclosure, the cylinder body mount is welded to cylinder body with or without the threads.

Figure 8:
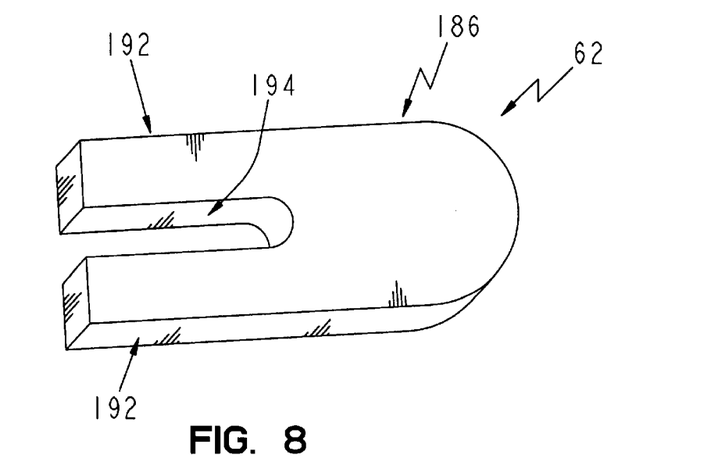
FIG. 8 is a perspective view of a cylinder body mount of the cylinder housing.

Mount portion 186 extends transverse to the central axis of shaft 54 and includes a pair of arms 192 defining a passage 194, as shown in FIG. 8, sized to receive a fastener 196, such as a bolt (see FIG. 1), to couple mounting portion 186 and the remainder of weld cylinder 50 to a fixture. Other configurations of the mounting portion are also provided. For example, according to alternative embodiments, the mounting portion is formed to include one or more through holes sized to receive the fastener. According to another embodiment of the present disclosure, the mounting portion includes a pair of transversely extending mounting portions positioned on opposite sides of the closure portion and each mounting portion includes a through passage or hole(s) sized to receive a bolt or other fastener therein. According to alternative embodiments of the present disclosure the cylinder body mount is coupled to the cylinder body at positioned between the first and second ends thereof.

Although the invention has been described with reference to preferred embodiments, variations and modifications exist within the scope and spirit of the invention as described and defined in the following claims.

What is claimed is:

1. A fluid cylinder configured to move an object between first and second positions, the fluid cylinder comprising
   a cylinder housing,
   a shaft configured to move between extended and retracted positions relative to the cylinder housing, the shaft including a central axis and an outer surface,
   an actuation piston configured to move the shaft between the extended and retracted positions,
   a metallic scraper positioned to contact the outer surface of the shaft to remove contaminants therefrom during movement of the shaft, and
   an anti-rotation mechanism positioned to prevent rotation of the shaft about the central axis.

2. The fluid cylinder of claim 1, wherein the scraper includes an inner edge that contacts the outer surface of the shaft and defines a circular opening sized to receive the shaft.

3. The fluid cylinder of claim 1, wherein the cylinder housing including a cylinder body and a closure, the shaft extends through the closure of the cylinder housing, and the anti-rotation mechanism is spaced apart from the closure.

4. The fluid cylinder of claim 1, wherein the anti-rotation mechanism includes a rod having a non-circular circumference.

5. The fluid cylinder of claim 4, wherein the piston includes an edge defining a non-circular opening sized to receive the rod of the anti-rotation mechanism.

6. The fluid cylinder of claim 4, wherein the non-circular circumference is hexagonal.

7. The fluid cylinder of claim 4, wherein the rod is stationary.

8. The fluid cylinder of claim 4, wherein the cylinder housing includes a cylinder body and spaced-apart closures and the rod of the anti-rotation mechanism having the non-circular circumference is spaced apart from the closures.

9. The fluid cylinder of claim 1, wherein the scraper is spaced apart from the anti-rotation mechanism.

10. The fluid cylinder of claim 1, wherein the anti-rotation mechanism is positioned totally within the cylinder housing.

11. The fluid cylinder of claim 1, wherein the scraper has a unexpanded state in which it has an inside diameter less than a diameter of the shaft where the scraper contacts the shaft and an expanded state in which the inside diameter is substantially equal to the diameter of the shaft.

12. The fluid cylinder of claim 1, wherein an interior space between the piston and the scrapper is unsealed from the atmosphere.

13. The fluid cylinder of claim 1, further comprising a bearing guiding the shaft and positioned between the scraper and the piston.

14. The fluid cylinder of claim 1, wherein the actuation piston includes at least two actuation piston heads and a rod positioned to couple the actuation piston heads together.

15. The fluid cylinder of claim 1, further comprising a stationary piston coupled to the cylinder housing, wherein the actuation piston includes a hollow rod and an actuation piston head coupled to the hollow rod, the stationary piston includes a stationary piston head positioned in the hollow rod, the actuation piston head and stationary piston head cooperate to define a space therebetween, the hollow rod includes an aperture permitting communication of fluid through the hollow rod with the space defined between the actuation and stationary piston heads.

16. The fluid cylinder of claim 1, further comprising a stationary piston coupled to the cylinder housing, wherein the actuation piston includes a hollow rod, a first actuation piston head coupled to the hollow rod, and a second actuation piston head coupled to the hollow rod, the first actuation piston head is spaced apart from the second actuation piston head, the stationary piston includes a first stationary piston head positioned in the hollow rod between the first and second actuation piston heads, and a second stationary piston head positioned in the hollow rod and spaced apart from the first stationary piston head.

17. The fluid cylinder of claim 1, further comprising a stationary piston coupled to the cylinder housing, wherein the actuation piston includes a hollow rod and an actuation piston head coupled to the hollow rod, the hollow rod has first and second ends positioned between first and second ends of the cylinder housing when the shaft is in the extended position, and the stationary piston includes a stationary piston head positioned in the hollow rod.

18. The fluid cylinder of claim 1, further comprising a stationary piston coupled to the cylinder housing, wherein the actuation piston includes a hollow rod and an actuation piston head coupled to the hollow rod, and the stationary piston includes a stationary piston head positioned in the hollow rod.

19. The fluid cylinder of claim 1, wherein the cylinder housing includes a cylinder body and a cylinder body mount having a closure portion configured to close an end of the cylinder body and a mount portion configured to mount to a fixture, the closure portion is coupled to the mount portion, the cylinder housing further includes means for coupling the cylinder body mount to the cylinder body without heating the cylinder body.

20. A fluid cylinder configured to move an object between first and second positions, the fluid cylinder comprising
a cylinder housing,
a shaft configured to move between extended and retracted positions relative to the cylinder housing, the shaft including a central axis and an outer surface,
an actuation piston configured to move the shaft between the extended and retracted positions, the piston including at least two actuation piston heads and a rod positioned to couple the actuation piston heads together, and
a scraper positioned to contact the outer surface of the shaft to remove contaminants therefrom during movement of the shaft.

21. The fluid cylinder of claim 20, wherein the rod is hollow and the actuation piston heads are positioned in the rod.

22. The fluid cylinder of claim 20, wherein the shaft is non-hollow.

23. A fluid cylinder configured to move an object between first and second positions, the fluid cylinder comprising
a cylinder housing,
a shaft configured to move between extended and retracted positions relative to the cylinder housing, the shaft including a central axis and an outer surface,
an actuation piston configured to move the shaft between the extended and retracted positions, the piston including at least two actuation piston heads and a rod positioned to couple the actuation piston heads together,
a scraper positioned to contact the outer surface of the shaft to remove contaminants therefrom during movement of the shaft, and
a stationary piston coupled to the housing, the stationary piston including a stationary piston head positioned between the actuation piston heads and a rod coupling the stationary piston head to the housing.

24. The fluid cylinder of claim 23, wherein the scraper is metallic.

25. The fluid cylinder of claim 23, wherein the scraper has a unexpanded state in which it has an inside diameter less than a diameter of the shaft where the scraper contact the shaft and an expanded state in which the inside diameter is substantially equal to the diameter of the shaft.

26. The fluid cylinder of claim 23, wherein an interior space between the piston and the scraper is unsealed from the atmosphere.

27. The fluid cylinder of claim 23, further comprising a bearing guiding the shaft and positioned between the scraper and the piston.

28. A fluid cylinder configured to move an object between first and second positions, the fluid cylinder comprising
a cylinder housing including a cylinder body having a first end and a second end spaced apart from the first end and a closure coupled to the first end of the cylinder body,
a shaft positioned to extend through the closure of the cylinder housing and move between extended and retracted positions relative to the cylinder housing, the shaft having a central axis,
a piston configured to move the shaft between the extended and retracted positions, and
an anti-rotation mechanism including a rod having a substantially flat side wall configured to prevent rotation of the shaft about the central axis, the anti-rotation mechanism being spaced apart from the closure and coaxial with the central axis of the shaft.

29. The fluid cylinder of claim 28, wherein the closure has an edge defining a circular opening sized to receive the shaft.

30. The fluid cylinder of claim 28, further comprising a scraper configured to contact the shaft and remove contaminants therefrom during movement of the shaft to the retracted position.

31. The fluid cylinder of claim 28, wherein the scraper has a unexpanded state in which it has an inside diameter less than a diameter of the shaft where the scraper contacts the shaft and an expanded state in which the inside diameter is substantially equal to the diameter of the shaft.

32. The fluid cylinder of claim 28, wherein an interior space between the piston and the scraper is unsealed from the atmosphere.

33. The fluid cylinder of claim 28, further comprising a bearing guiding the shaft and positioned between the scraper and the piston.

34. A fluid cylinder configured to move an object between first and second positions, the fluid cylinder comprising
a cylinder housing including a cylinder body having a first end and a second end spaced apart from the first end and a closure coupled to the first end of the cylinder body,
a shaft positioned to extend through the closure of the cylinder housing and move between extended and retracted positions relative to the cylinder housing, the shaft having a central axis, a piston configured to move the shaft between the extended and retracted positions, and an anti-rotation mechanism configured to prevent rotation of the shaft about the central axis, the anti-rotation mechanism being spaced apart from the closure and coaxial with the central axis of the shaft, the anti-rotation mechanism including a rod and the piston includes an edge defining an opening sized to receive the rod.

35. The fluid cylinder of claim 34, wherein the rod is stationary.

36. The fluid cylinder of claim 34, wherein the rod including an outer surface that is coaxial with the central axis of the shaft.

37. The fluid cylinder of claim 36, wherein the outer surface includes a plurality of longitudinally extending flats.

38. The fluid cylinder of claim 36, wherein the outer surface is polygonal.

39. The fluid cylinder of claim 34, wherein the housing includes an inner surface defining an interior region sized to receive the piston and the anti-rotation mechanism is spaced apart from the inner surface of the housing.

40. A fluid cylinder configured to move an object between first and second positions, the fluid cylinder comprising a cylinder housing, a shaft positioned to move between extended and retracted positions relative to the cylinder housing, an actuation piston positioned in the housing and configured to move the shaft between the extended and retracted positions, the actuation piston including a hollow rod and an actuation piston head coupled to the hollow rod, and a stationary piston coupled to the housing, the stationary piston including a stationary piston head positioned in the hollow rod, the actuation piston head and stationary piston head cooperating to define a space therebetween, the hollow rod including an aperture permitting communication of fluid through the hollow rod with the space defined between the actuation and stationary piston heads.

41. The fluid cylinder of claim 40, wherein the cylinder housing includes first and second ends and the aperture of the hollow rod is positioned between the first and second ends when the shaft is in the extended position.

42. The fluid cylinder of claim 40, wherein the cylinder housing includes an inner surface defining an interior region sized to receive the actuation piston, the hollow rod and the inner surface cooperate to define a passage therebetween in fluid communication with the aperture of the hollow rod.

43. The fluid cylinder of claim 40, wherein the stationary piston further includes a stationary rod coupling the stationary piston head to the housing, the actuation piston head including an edge defining an opening sized to receive the stationary rod.

44. The fluid cylinder of claim 40, wherein the actuation piston further includes a second actuation piston head coupled to the hollow rod, the stationary piston further includes a stationary rod extending through the second actuation piston head, and the second actuation piston head and the stationary piston head cooperate to define a space therebetween.

45. The fluid cylinder of claim 40, wherein the actuation piston includes a plurality of axially spaced-apart piston heads coupled to the hollow rod and the hollow rod includes a plurality of axially spaced-apart apertures.

46. A fluid cylinder configured to move an object between first and second positions, the fluid cylinder comprising a cylinder housing, a shaft positioned to move between extended and retracted positions relative to the cylinder housing, an actuation piston positioned in the housing and configured to move the shaft between the extended and retracted positions, the actuation piston including a hollow rod, a first actuation piston head coupled to the hollow rod, and a second actuation piston head coupled to the hollow rod, the first actuation piston head being spaced apart from the second actuation piston head, and a stationary piston coupled to the housing and including a first stationary piston head positioned in the hollow rod between the first and second actuation piston heads, and a second stationary piston head positioned in the hollow rod and spaced apart from the first stationary piston head.

47. The fluid cylinder of claim 46, wherein the stationary piston further includes a rod coupling the first and second piston heads to the housing.

48. The fluid cylinder of claim 47, wherein the second stationary piston head and the second actuation piston head cooperate to define a space therebetween and the rod is formed to include a passage in fluid communication with the space.

49. The fluid cylinder of claim 47, wherein the rod includes a non-circular outer surface and at least one of the first and second actuation piston heads includes an edge defining a non-circular opening sized to receive the non-circular outer surface of the rod.

50. The fluid cylinder of claim 47, wherein the rod extends between the first and second stationary piston heads.

51. The fluid cylinder of claim 46, wherein the cylinder housing includes a cylinder body and a closure coupled to the cylinder body, the closure includes an opening sized to receive the shaft therein.

52. A fluid cylinder configured to move an object between first and second positions, the fluid cylinder comprising a cylinder housing including a first end and a second end spaced apart from the first end, a shaft positioned to move between extended and retracted positions relative to the cylinder housing, an actuation piston positioned in the housing and configured to move the shaft between the extended and retracted positions, the actuation piston including a hollow rod and an actuation piston head coupled to the hollow rod, the hollow rod having first and second ends positioned between the first and second ends of the cylinder housing when the shaft is in the extended position, and a stationary piston coupled to the housing and including a stationary piston head positioned in the hollow rod.

53. The fluid cylinder of claim 52, wherein the shaft is coupled to the actuation piston head.

54. The fluid cylinder of claim 52, wherein the cylinder housing includes a cylinder body and a closure coupled to the cylinder body and including an opening sized to receive the shaft.

55. The fluid cylinder of claim 52, wherein the actuation piston further includes a seal coupled to the hollow rod to provide a seal between the cylinder housing and the hollow rod.

56. A fluid cylinder configured to move an object between first and second positions, the fluid cylinder comprising a cylinder housing, a shaft positioned to move between extended and retracted positions relative to the cylinder housing, an actuation piston positioned in the housing and configured to move the shaft between the extended and retracted positions, the actuation piston including a hollow rod and an actuation piston head coupled to the hollow rod, a stationary piston coupled to the housing and including a stationary piston head positioned in the hollow rod, and an anti-rotation mechanism positioned in the hollow rod.

57. The fluid cylinder of claim 56, wherein anti-rotation mechanism includes a rod and the actuation piston head includes an opening sized to receive the rod therein.

58. The fluid cylinder of claim 55, wherein the shaft includes a central axis and the anti-rotation mechanism is co-axial with the central axis.

59. The fluid cylinder of claim 55, wherein the anti-rotation mechanism is spaced apart from the shaft.

60. The fluid cylinder of claim 55, wherein cylinder housing includes a cylinder body having an inner surface defining an interior region, the actuation piston is positioned in the interior region, and the anti-rotation mechanism is spaced apart from cylinder housing.

61. A fluid cylinder for use with a fixture, the fluid cylinder comprising a cylinder housing including a cylinder body and a cylinder body mount having a closure portion configured to close an end of the cylinder body and a mount portion configured to mount to the fixture, the closure portion being coupled to the mount portion, the cylinder housing further including means for coupling the cylinder body mount to the cylinder body without heating the cylinder body, a shaft positioned to move between extended and retracted positions relative to the cylinder housing, and a piston configured to move the shaft between the extended and retracted positions.

62. The fluid cylinder of claim 61, wherein the coupling means includes male and female threads formed in the cylinder housing and closure portion of the cylinder body mount.

63. The fluid cylinder of claim 61, wherein the shaft includes a central axis and the mount portion of the cylinder body mount extends transverse to the central axis.

64. The fluid cylinder of claim 61, wherein the mount portion of the cylinder body mount includes a pair of spaced-apart surfaces and a passage extending therebetween to permit passage of a fastener through the mount portion.

65. The fluid cylinder of claim 61, wherein the closure portion of the cylinder is positioned within the cylinder body.

66. The fluid cylinder of claim 61, wherein the coupling means is positioned within the cylinder housing.

67. The fluid cylinder of claim 61, wherein the mount portion of the cylinder body mount and the closure portion of the cylinder body mount are integral.

* * * * *